Figure 1:
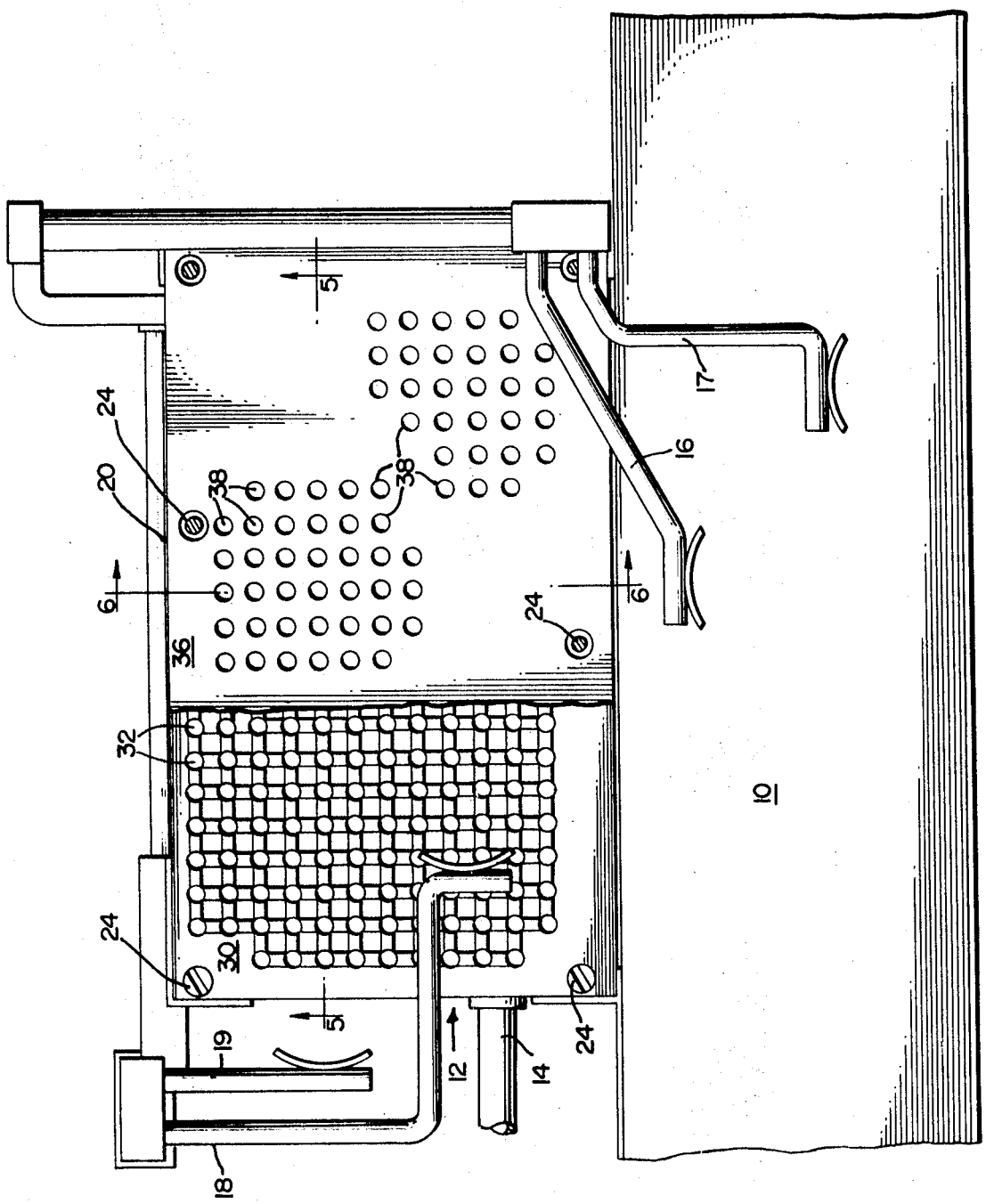

United States Patent

[11] 3,607,196

| | | |
|---|---|---|
| [72] | Inventor | Francis J. Garvey<br>Newfield, N.J. |
| [21] | Appl. No. | 715,819 |
| [22] | Filed | Mar. 25, 1968 |
| [45] | Patented | Sept. 21, 1971 |
| [73] | Assignee | Garvey Products Corporation<br>Blue Anchor and Hammonton, N.J. |

[54] DEAD PLATE ASSEMBLY FOR FRESHLY FORMED GLASSWARE
9 Claims, 7 Drawing Figs.

[52] U.S. Cl. .................................................. 65/167,
65/348, 65/351
[51] Int. Cl. .................................................. C03b 27/00
[50] Field of Search .......................................... 65/348,
349, 350, 351; 165/146, 147; 239/601; 18/8

[56] References Cited
UNITED STATES PATENTS

| | | | |
|---|---|---|---|
| 3,171,528 | 3/1965 | Anderson.................... | 65/348 |
| 3,245,113 | 4/1966 | Sulich.......................... | 18/8 |
| 3,404,845 | 10/1968 | Schmeling.................... | 239/601 |
| 3,510,288 | 5/1970 | Rowe et al................... | 65/348 X |

Primary Examiner—S. Leon Bashore
Assistant Examiner—J. B. Hardaway
Attorney—Albert H. Kirchner ABSTRACT: A dead plate is provided in three mutually superposed layers: (1) a strong flat bottom layer fully perforated all over and permanently covering the air box, (2) a similarly perforated readily removable top layer formed with spaced depressions and elevated points for making minimal contact with the hot newly molded glassware, and (3) an intervening flat plate interchangeably selected from a series each of which is provided with perforations in a limited area of special pattern for conforming desirably closely to a particular size and shape of ware intended to traverse the dead plate.

INVENTOR.
FRANCIS J. GARVEY
BY Albert H. Kichner
ATTORNEY

INVENTOR.
FRANCIS J. GARVEY
BY Albert H. Kirchner
ATTORNEY

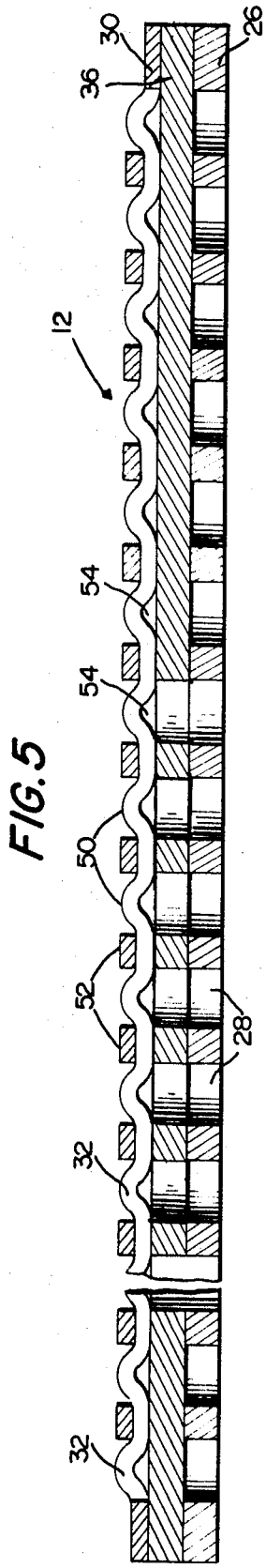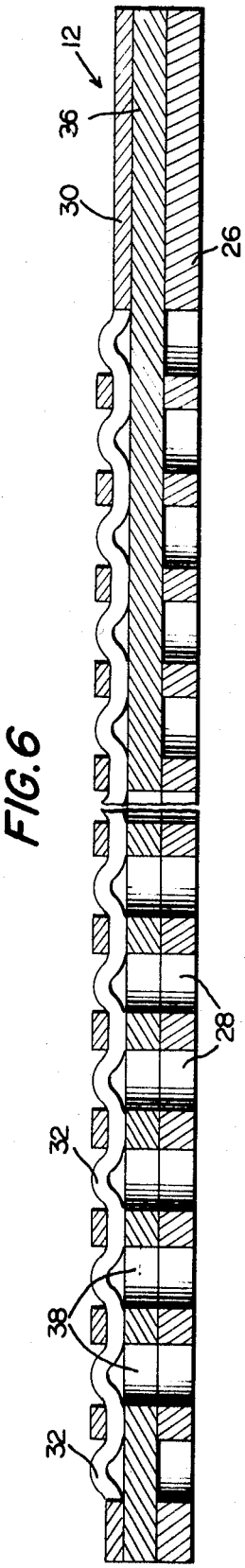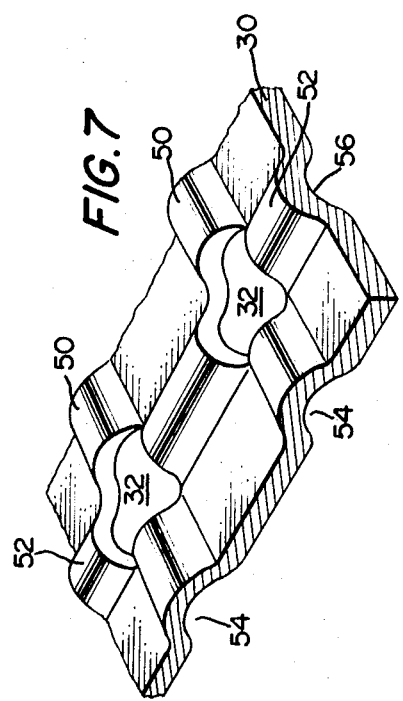

DEAD PLATE ASSEMBLY FOR FRESHLY FORMED GLASSWARE

The present invention relates to dead plates for use in glassware manufacturing and more particularly provides a novel dead plate assembly for use in conveying the output of newly molded glass articles from the molds to stations for subsequent processing.

In the production of molded glassware such as bottles, tumblers, jars and the like, hereinafter generically designated ware, the molding machine conventionally discharges its hot product onto a dead plate where it stands momentarily while being subjected to cooling streams of air and from which it is then moved onto a conveyor for further treatment, such as fire polishing. The usual arrangement includes an air box topped by a perforated cover onto which the ware is deposited and off of which it is slided onto a discharging conveyor. Air under pressure in the box blows up through the perforations to cool the ware while it stands on the dead plate. The standard practice has been to provide the box with a permanently secured dead plate covering it and to form in the dead plate a multiplicity of perforations over its entire surface, or, in some cases, with perforations in a special pattern corresponding to the particular ware intended to be handled.

The problem of most efficiently transferring and dissipating heat from the ware was best solved in the prior art by making the dead plate of such materials as "Transite," which is a hard asbestos-cementitious product of low heat conductivity. Because this material is brittle and has little structural strength, it has generally been necessary to use it as the surfacing only of an iron or steel subplate. This combination of the two plates gives adequate strength to the air box, not for the purpose of supporting the weight of the ware but rather to withstand unusual loads such as the weight of a workman standing on the box while making adjustments, repairs, etc., in the maintenance of the large and complex apparatus of which the air box is only a small element.

These dead plate constructions are inefficient in conducting heat from the ware. Moreover, if perforated uniformly over their entire area they are inefficient in the discharge of air from the box, much of which is wasted by being misdirected out of contact with the ware. If the perforations are provided in a special pattern corresponding to some particular ware, such for example as a large article of particular shape, it becomes impossible, or at least highly inefficient, to deposit onto the air box ware from different molds, such as smaller articles or articles of some other shape.

The present invention aims to overcome the foregoing and other disadvantages of the best prior art air box and dead plate arrangements by providing the standard air box with a readily replaceable composite dead plate comprising a sandwiched structure of three plate elements that are readily arranged and rearranged to accommodate with a high degree of thermal efficiency any one of many different ware sizes and shapes, so that a single air box thus equipped may be readily adjusted so as to serve to connect a receiving conveyor with any of many different kinds of molding apparatus.

Figure 2:
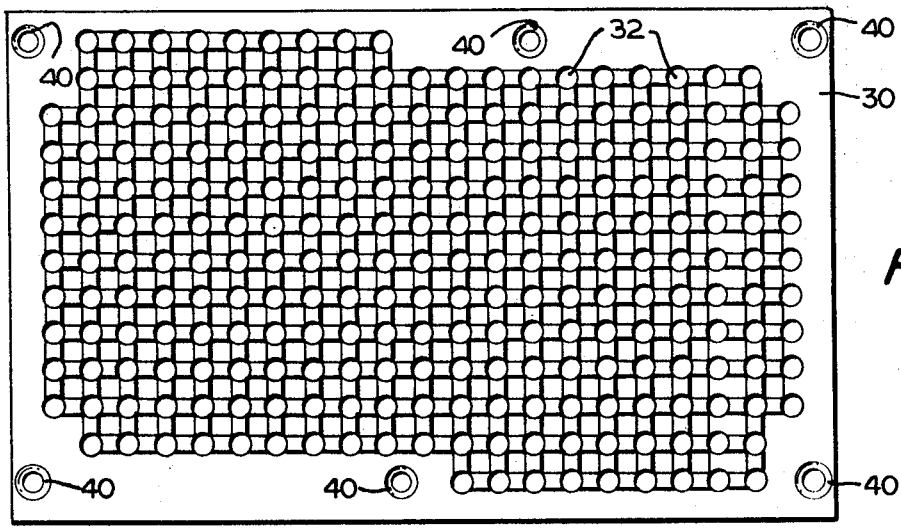
Figure 3:
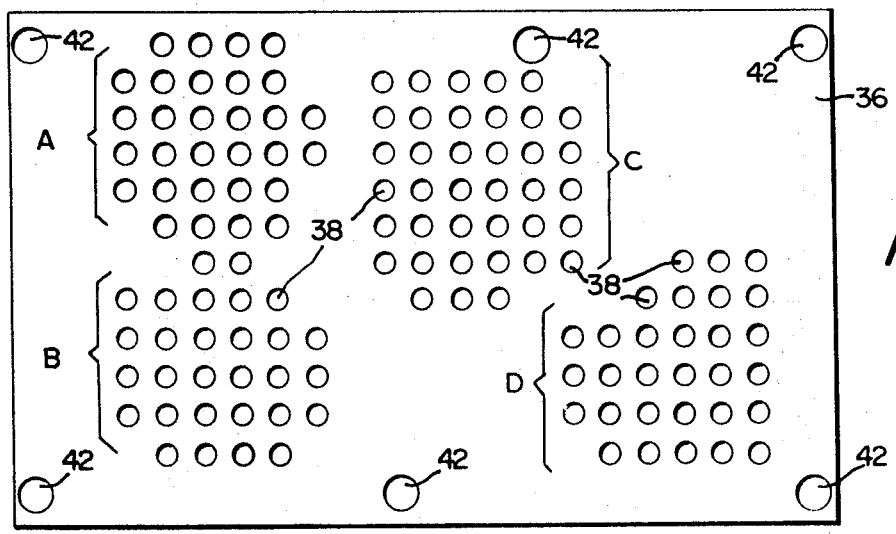
Figure 4:
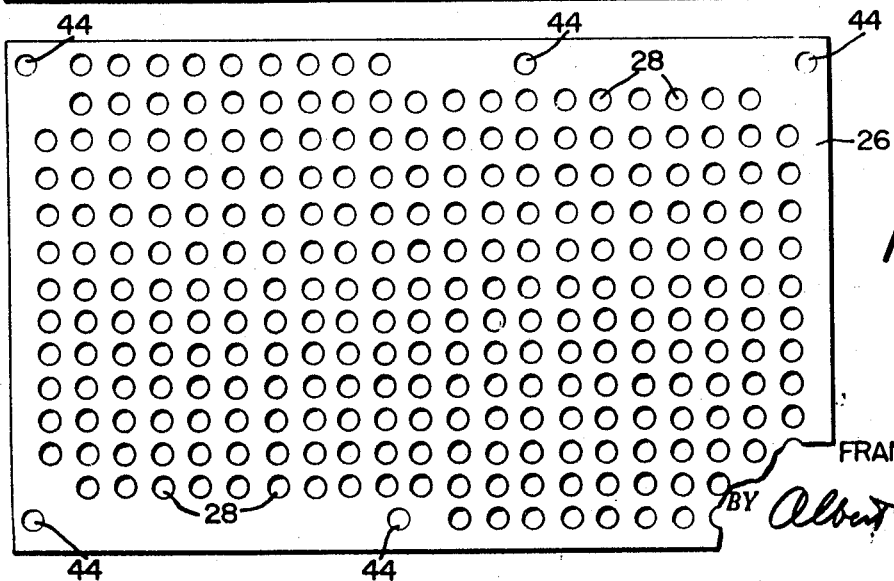

A preferred embodiment of the invention which has been thoroughly tested in practical use and which is accordingly at present preferred is shown in the accompanying drawings in which FIG. 1 is a top plan view of a dead plate assembly constructed in accordance with the invention installed as an adjunct to a conventional receiving conveyor and a typical kind of transfer mechanism, with the top plate element of the assembly partially broken away to show the intermediate element;

FIG. 2 is a top plan view of the top plate element;
FIG. 3 is a top plan view of the intermediate plate element;
FIG. 4 is a top plan view of the bottom plate element;
FIG. 5 is a longitudinal sectional view of the assembly, taken along the line 5—5 of FIG. 1;
FIG. 6 is a transverse sectional view of the assembly, taken along the line 6—6 of FIG. 1; and
FIG. 7 is a detail perspective view of the top plate element.

In these figures the reference numeral 10 designates a conventional endless belt or other type conveyor designed to receive newly molded glassware articles from an adjacent dead plate which covers a conventional air box. In FIG. 1 the air box is understood to be located beneath the new dead plate assembly, which is designated generally 12, and is supplied with air under pressure by a pipe 14. Adjunct to the air box is a transfer mechanism, in the present case consisting of arms 16, 17, 18 and 19, which are provided in design and number appropriate for whatever particular kind and size of ware will be deposited on the air box from the molds. These arms are operated by rods, links and the like, not shown, in a manner well understood in the art. The transfer arrangement is changeable to suit the ware. In the example chosen for illustration in FIG. 1 the arrangement is for handling a double deposit, i.e., the molds will set two articles simultaneously side by side on the left-hand half of the air box; the arms 18 and 19 will then move the two articles over onto the right-hand half of the box. The arms 16 and 17, shown in FIG. 1 as being over the conveyor 10, will at this time have been retracted fully across the box, beyond the far edge 20 of the dead plate cover of the box. Thereafter these arms will move across the dead plate to their positions over the conveyor, shown in the figure, carrying the two articles onto the conveyor, and at the same time the arms 18 and 19 will be withdrawn to the position in which they are shown in the figure, ready to engage two new articles which will be deposited in front of them on the dead plate, for repetition of the cycle.

This is the arrangement used for a double gob molding machine, which molds two articles at one time.

For a single gob machine, producing only one article at a time, a transfer mechanism comprising only two arms will be substituted. One of these articles will move the single article along the length of the air box, from left to right as seen in FIG. 1, and the other will later move it across the box, onto the conveyor.

It will be appreciated that an arrangement of perforations in the dead plate forming the top of the air box suitable for directing air with maximum efficiency up along the two relatively small articles of a double gob machine will not be equally efficient when the transfer mechanism is modified to deposit only a single, larger article.

A primary object of the present invention is to provide a dead plate construction that can be readily adjusted to maintain high cooling efficiency when the machine is thus altered.

This is accomplished by the special novel dead plate structure which is best shown in FIGS. 2–6. It consists of an assembly of three metal plates stacked in superposed arrangement one on another, each plate being rectangular in shape corresponding to the shape and size of the top plan of the air box, so that the assembly fully covers the box, to which it is removably secured as by marginal screws 24.

The bottom plate, designated 26 in FIGS. 4, 5 and 6, is best made of steel and is intended to be relatively permanently mounted on the air box. As shown in FIG. 4, this plate is formed with a multiplicity of closely spaced air-passing perforations over substantially its entire area. The plate is of sufficiently heavy gauge, e.g., one-eighth inch, so as in and of itself to provide the air box with a very strong cover, making the box strong enough to support the weight of a standing workman or any other unusual load that may be imposed on it.

The top plate, designated 30 in FIGS. 2, 5 and 6, is best made of brass or bronze and is similarly formed with perforations 32 over substantially its entire area so that when superposed on the bottom plate 26 each of the perforations 32 will register with one of the perforations 28. In the interest of economy and because the bottom plate is made of stout steel, and for a further reason hereinafter to be explained, the brass or bronze top plate may be made of considerably thinner gauge, as suggested in FIGS. 5 and 6.

Sandwiched between the plates 26 and 30 in the assembly is an intermediate or intervening plate 36 which is best made of aluminum, in a gauge which in view of the strength afforded to the assembly by the steel of the bottom plate is subject to wide variation but which, as hereinafter will be explained, is best made ⅛-inch thick.

This middle plate is formed with perforations 38 which are individually like the perforations 28 and 32 of the other two plates, and each of these perforations 38 is located so as to register with two perforations 28 and 32, one below it and one above it, when the three plates are assembled in sandwiched superposed relation as shown in FIGS. 5 and 6. However, the perforations 38 of the central or intermediate plate 36 differ from those of the other two plates in being arranged in a special pattern instead of covering substantially the entire plate area. One such pattern of perforations 38 is shown in FIG. 3, which illustrates one particular design of intermediate plate 36. It is important to note that a feature of the invention of primary importance is the use, in combination with the top and bottom plates 30 and 26, of a selected one intermediate plate from a group of intermediate plates which differ from each other in the pattern in which the perforations 38 are provided, and hence also in the area or areas which are left unperforated, as is well shown in FIG. 3. That is to say, the invention provides a plurality of plates 36, for mounting on a single, unchangeable bottom plate 26 and for being covered by a single unchangeable top plate 30, each of such plates 36 differing from the other plates 36 in its perforation pattern, i.e., in the location of the perforation groupings or clusters. It will be understood that FIG. 3 shows just one of such plates 36. This will be recognized as the same plate that is shown in FIG. 1, and with reference to FIG. 1 and the transfer arms 16, 17, 18 and 19 will be recognized as suitable for use with molds which are designed to deposit two hot glass articles on the air box, side by side, at the left-hand portion of FIG. 1, each in front of one of the arcuate pusher blades of the arms 18, 19, over the perforation clusters A and B, thereafter to be moved by those arms to positions overlying respectively the two clusters of perforations 38 shown at the right-hand portion of FIG. 1 and designated C and D.

It will be recognized by reference to FIG. 3 that because of the special perforation pattern of the particular intermediate plate there shown, glassware deposited as just explained, on the top plate 30 of the assembly including this particular intermediate plate will immediately have an abundance of air supplied to it from the air box through perforation clusters A and B, while a similar abundance is being supplied to the immediately previously deposited ware that is now standing on perforation clusters C and D, and that substantially no air is being discharged from the air box through any other portions of the dead plate assembly where it would not impinge on any ware and hence would be wasted.

To facilitate interchange of intermediate plates 36 and insure accurate register of the perforations of the three plates it is useful to countersink the holes 40 in the top plate margins, surrounding each hole with an embossment protruding beyond the plane of the bottom surface of the plate, so that this embossment will stand in and center itself in the larger diameter hole 42 in the intermediate plate when screws 24 are turned down through these holes and the holes 44 in the bottom plate 26.

To improve the supply of air to the surfaces of the ware and reduce the area of contact of the ware with the dead plate surface the top plate 30 may be formed with spaced parallel lines of upstanding ribs intersecting in right-angular relation, with the perforations of the plate located in the intersections, and with the under side of each rib forming with the subjacent intervening plate a shallow air passageway and with the crests of the ribs providing minimal contact with the ware. Such a construction is shown in the drawings, and particularly in FIG. 7 where the plate 30 is shown deformed, as by a pressing or stamping operation, from the original flat sheet form of the blank stock, to form on the top surface of the plate upstanding spaced ribs 50 running parallel in one direction, intersecting with similarly parallel-spaced upstanding ribs 52 running right angularly to the ribs 50, with the holes 32 formed at the points of intersection, and with shallow passageways 54 and 56 underlying respectively the ribs 50 and 52.

It will be obvious that if the new dead plate assembly of the three sandwiched plates is to replace the prior art single dead plate structure made up of a two-ply lower metal plate and an upper-ply "Transite" plate more or less permanently united, then the overall thickness of the assembly must be the same as that of the replaced dead plate structure in order for the plane of the top of the air box to be flush with the receiving conveyor.

The standard prior art total dead plate thickness is three-eights inch, made up of a ⅛-inch thick steel plate and a ¼-inch thick sheet of "Transite," and exactly this thickness is achieved by the above recommended gauges of the new three-plate elements. That is to say, with the steel bottom plate and the aluminum intermediate plate each one-eighth inch in thickness, and the brass or bronze intermediate plate made from stock 1/16-inch thick, and the ribs 50, 52 upstanding one-sixteenth inch above the plate surface, the total thickness of the composite assembly, from the plane of the under surface of the bottom plate to the plane of the top plate on which the ware rests, i.e., the crests of the ribs, is three-eighths inch, so that the new assembly is perfectly acceptable as a replacement for the standard prior art dead plate.

It is found that the use of brass or bronze for the top plate materially reduces checking of the ware because those metals are much better heat conductors than "Transite" and plates made of them promptly heat up toward the temperature of the ware while rapidly conducting heat off from the ware, so that the oncoming glass is not shocked by being suddenly placed on a relatively cool surface.

It is believed to be evident from the foregoing that the disclosed embodiment of the invention successfully achieves the objects set forth at the introduction to this specification.

Various changes, omissions and additions may be made in this preferred embodiment of the invention without departing from the principles of the invention as defined by the appended claims.

I claim:

1. In a conveyor system for hot newly molded glassware wherein quantities of ware of different shapes and sizes are moved in successive lots across the top of an air box and the individual articles are stopped momentarily for subjection to cooling air from said box, the combination with said box of a dead plate covering comprising an assembly of three plates secured in stacked superposed engagement with each other comprising a bottom plate of strong rigid metal substantially permanently mounted on said box and having substantially its entire area provided with a multiplicity of closely spaced air-passing perforations, a top plate having a multiplicity of perforations in substantially the same number and spacing as the bottom plate, each in substantial register with one of the perforations of the bottom plate, and a replaceable intermediate plate having substantial imperforate areas and at least one group of perforations in smaller number and the same spacing as those of the other two plates, each substantially registering with a perforation of each of the other two plates, arranged in a pattern conforming to the cooling requirements of an individual article of a particular lot of identical articles moved onto said assembly and stopped on said pattern, whereby air from said box is limited by said imperforate areas to discharge through the perforations of said pattern for maximum cooling application to the article stopped on said pattern.

2. A dead plate assembly as claimed in claim 1 in which the bottom plate is of steel.

3. A dead plate assembly as claimed in claim 1 in which the top plate is made of brass or bronze.

4. A dead plate assembly as claimed in claim 1 in which the intermediate plate is of aluminum.

5. A dead plate assembly as claimed in claim 1 in which the bottom plate is of steel, the top plate is made of brass or bronze, and the intermediate plate is of aluminum.

6. A dead plate assembly as claimed in claim 1, including a plurality of interchangeable intermediate plates each configured with a different pattern of perforations and being thereby adapted to provide the combination with the top and bottom plates of a series of perforations through all three plates suited for cooling ware of a particular size and shape.

7. A dead plate assembly as claimed in claim 6 in which all the plates of the assembly are provided with interfitting depressions and embossments for constraining the plates into stacked relation with the perforations of the three plates in accurate register.

8. A dead plate assembly as claimed in claim 7 in which the plates are rectangular in shape and said depressions and embossments surround holes in the corners for passing screws for mounting the assembly on said air box.

9. A dead plate assembly as claimed in claim 1 in which the top plate is formed with spaced parallel lines of upstanding ribs intersecting in right-angular relation, with the perforations of said plate located in the intersections, with the underside of each rib forming with the intermediate plate a shallow lateral passageway for air rising through the perforations in the intermediate plate and with the crests of the ribs providing minimal contact for the ware.